(12) United States Patent
Mondal et al.

(10) Patent No.: US 10,922,276 B2
(45) Date of Patent: Feb. 16, 2021

(54) ONLINE FILE SYSTEM CHECK

(71) Applicant: HEWLETT PACKARD ENTERPRISE DEVELOPMENT LP, Houston, TX (US)

(72) Inventors: Santigopal Mondal, Bangalore (IN); Anand Andaneppa Ganjihal, Bangalore (IN); Anoop Kumar Raveendran, Bangalore (IN); Sandya Srivilliputtur Mannarswamy, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 617 days.

(21) Appl. No.: 15/521,370

(22) PCT Filed: Jan. 15, 2015

(86) PCT No.: PCT/US2015/011582
§ 371 (c)(1),
(2) Date: Apr. 24, 2017

(87) PCT Pub. No.: WO2016/076903
PCT Pub. Date: May 19, 2016

(65) Prior Publication Data
US 2017/0316027 A1    Nov. 2, 2017

(30) Foreign Application Priority Data

Nov. 10, 2014   (IN) ............................ 5654/CHE/2014

(51) Int. Cl.
*G06F 16/00*      (2019.01)
*G06F 16/17*      (2019.01)
(Continued)

(52) U.S. Cl.
CPC .......... *G06F 16/1727* (2019.01); *G06F 16/13* (2019.01); *G06F 16/134* (2019.01); *G06F 16/182* (2019.01)

(58) Field of Classification Search
CPC .......... G06F 16/10; G06F 16/11; G06F 16/13; G06F 16/119; G06F 16/134;
(Continued)

(56) References Cited

U.S. PATENT DOCUMENTS 6,728,922 B1 *  4/2004  Sundaram ........... G06F 11/1076
                                                      714/763
6,732,124 B1 *  5/2004  Koseki ................ G06F 11/1435
                                                      707/999.202
(Continued)

FOREIGN PATENT DOCUMENTS

| CN | 1293492 A | 5/2001 |
| CN | 1293492 C | 1/2007 |

(Continued)

OTHER PUBLICATIONS

International Search Report and Written Opinion received for PCT Patent Application No. PCT/US2015/011582, dated Jun. 29, 2015, 10 pages.

(Continued)

*Primary Examiner* — Ashish Thomas
*Assistant Examiner* — Rezwanul Mahmood
(74) *Attorney, Agent, or Firm* — Hewlett Packard Enterprise Patent Department

(57) ABSTRACT

Storage space may be allocated from a non-reserved zone of a file system when the file system is not undergoing an online file system check. When the file system is undergoing an online file system check, storage space is allocated from a soft-reserved zone.

14 Claims, 7 Drawing Sheets

(51) Int. Cl.
*G06F 16/13* (2019.01)
*G06F 16/182* (2019.01)

(58) Field of Classification Search
CPC .... G06F 16/181; G06F 16/182; G06F 16/183; G06F 16/1728; G06F 16/1748; G06F 16/1767; G06F 16/1847; G06F 16/1865
See application file for complete search history.

(56) References Cited

U.S. PATENT DOCUMENTS

| | | | | |
|---|---|---|---|---|
| 7,243,207 B1* | 7/2007 | Prakash | G06F 16/10 | 711/202 |
| 7,305,393 B2* | 12/2007 | Seeger | G06F 16/10 | 707/999.202 |
| 7,386,559 B1* | 6/2008 | Desai | G06F 16/13 | 707/999.104 |
| 7,552,146 B1* | 6/2009 | Kahn | G06F 11/1076 | 707/999.202 |
| 7,694,191 B1* | 4/2010 | Bono | G06F 11/004 | 714/48 |
| 7,743,035 B2* | 6/2010 | Chen | G06F 3/0665 | 707/674 |
| 7,814,273 B2* | 10/2010 | Barrall | G06F 3/0607 | 711/114 |
| 7,818,302 B2 | 10/2010 | Godbole | | |
| 7,818,535 B1* | 10/2010 | Bono | G06F 3/0685 | 711/173 |
| 7,899,795 B1* | 3/2011 | Kahn | G06F 11/0793 | 707/690 |
| 8,010,503 B1* | 8/2011 | Chen | G06F 16/10 | 707/679 |
| 8,028,011 B1* | 9/2011 | Pawar | G06F 16/172 | 707/830 |
| 8,037,345 B1* | 10/2011 | Iyer | G06F 11/2094 | 714/6.12 |
| 8,103,639 B1* | 1/2012 | Srinivasan | G06F 16/134 | 707/690 |
| 8,103,776 B2 | 1/2012 | DeHaan | | |
| 8,266,191 B1 | 9/2012 | Aggarwal et al. | | |
| 8,285,758 B1* | 10/2012 | Bono | G06F 16/185 | 707/822 |
| 8,301,602 B1 | 10/2012 | Jiang et al. | | |
| 8,380,674 B1* | 2/2013 | Bolen | G06F 3/0665 | 707/657 |
| 8,566,371 B1 | 10/2013 | Bono et al. | | |
| 8,661,068 B1* | 2/2014 | Seibel | G06F 16/172 | 707/825 |
| 8,793,223 B1* | 7/2014 | Cho | G06F 11/1076 | 707/690 |
| 8,805,788 B2* | 8/2014 | Gross, IV | G06F 11/1451 | 707/649 |
| 8,972,345 B1* | 3/2015 | Aguilera | G06F 16/182 | 707/615 |
| 9,135,123 B1* | 9/2015 | Armangau | G06F 11/1471 | |
| 9,176,963 B2* | 11/2015 | Callahan | G06F 16/10 | |
| 9,223,788 B2* | 12/2015 | Ranade | G06F 11/0751 | |
| 9,361,306 B1* | 6/2016 | Pawar | G06F 16/1767 | |
| 9,519,590 B1* | 12/2016 | Armangau | G06F 12/0866 | |
| 9,542,396 B1* | 1/2017 | Pawar | G06F 11/1471 | |
| 9,697,219 B1* | 7/2017 | Wang | G06F 3/0619 | |
| 10,061,775 B1* | 8/2018 | Tripathi | G06F 16/50 | |
| 2003/0182389 A1* | 9/2003 | Edwards | G06F 16/10 | 709/213 |
| 2003/0217077 A1* | 11/2003 | Schwartz | G06F 16/10 | 707/999.2 |
| 2004/0078467 A1* | 4/2004 | Grosner | H04L 67/1095 | 709/226 |
| 2005/0132129 A1* | 6/2005 | Venkiteswaran | G06F 12/00 | 711/103 |
| 2006/0112222 A1* | 5/2006 | Barrall | G06F 11/1662 | 711/114 |
| 2006/0129611 A1* | 6/2006 | Adkins | G06F 11/1435 | 707/999.202 |
| 2007/0283080 A1* | 12/2007 | Bolanowski | G06F 12/0246 | 711/103 |
| 2008/0022133 A1* | 1/2008 | Sobel | G06F 21/6218 | 713/193 |
| 2008/0040385 A1* | 2/2008 | Barrall | G06F 16/128 | 707/999.103 |
| 2008/0172428 A1* | 7/2008 | Stokes | G06F 16/181 | 707/999.205 |
| 2008/0172563 A1* | 7/2008 | Stokes | G06F 21/80 | 713/193 |
| 2008/0189343 A1 | 8/2008 | Hyer et al. | | |
| 2009/0024810 A1* | 1/2009 | Ito | G06F 12/0246 | 711/159 |
| 2009/0182785 A1* | 7/2009 | Aston | G06F 11/1448 | 707/999.203 |
| 2009/0271581 A1* | 10/2009 | Hinrichs, Jr. | G06F 11/1441 | 711/162 |
| 2010/0115009 A1* | 5/2010 | Callahan | G06F 16/10 | 707/825 |
| 2011/0313973 A1* | 12/2011 | Srivas | G06F 16/235 | 707/634 |
| 2012/0095971 A1* | 4/2012 | Shyam | G06F 16/1774 | 707/690 |
| 2012/0117035 A1* | 5/2012 | Ranade | G06F 11/0751 | 707/690 |
| 2012/0130949 A1* | 5/2012 | Picken | G06F 16/128 | 707/626 |
| 2013/0024634 A1* | 1/2013 | Shitomi | G06F 16/119 | 711/162 |
| 2013/0332648 A1* | 12/2013 | Kandiraju | G06F 12/0246 | 711/103 |
| 2013/0332656 A1* | 12/2013 | Kandiraju | G06F 3/0619 | 711/103 |
| 2013/0332684 A1* | 12/2013 | Kandiraju | G06F 12/0246 | 711/161 |
| 2014/0279943 A1* | 9/2014 | Shiozawa | G06F 16/2365 | 707/690 |
| 2015/0012567 A1* | 1/2015 | Powell | G06F 16/188 | 707/809 |
| 2015/0186217 A1* | 7/2015 | Eslami Sarab | G06F 11/1435 | 707/649 |
| 2015/0213032 A1* | 7/2015 | Powell | G06F 3/067 | 707/827 |
| 2015/0317326 A1* | 11/2015 | Bandarupalli | G06F 16/24565 | 707/813 |
| 2016/0350358 A1* | 12/2016 | Patel | G06F 16/1748 | |
| 2017/0017413 A1* | 1/2017 | Aston | G06F 3/0659 | |
| 2017/0031932 A1* | 2/2017 | Berrington | G06F 16/13 | |
| 2017/0070575 A1* | 3/2017 | Royal | H04L 67/06 | |
| 2017/0147208 A1* | 5/2017 | Shu | G06F 16/11 | |
| 2017/0212690 A1* | 7/2017 | Babu | G06F 3/0608 | |
| 2017/0235509 A1* | 8/2017 | Chittenden | G06F 3/067 | 711/163 |
| 2017/0277709 A1* | 9/2017 | Strauss | G06F 3/0631 | |
| 2017/0277713 A1* | 9/2017 | Strauss | G06F 16/183 | |
| 2017/0277715 A1* | 9/2017 | Strauss | G06F 16/1865 | |
| 2017/0316027 A1* | 11/2017 | Mondal | G06F 16/1727 | |
| 2017/0337212 A1* | 11/2017 | Hayasaka | G06F 3/067 | |
| 2018/0046556 A1* | 2/2018 | Marathe | G06F 3/0688 | |
| 2018/0095984 A1* | 4/2018 | Ngo | G06F 16/188 | |

FOREIGN PATENT DOCUMENTS

WO WO-2011031903 A2 3/2001
WO WO-2010050944 A1 5/2010

OTHER PUBLICATIONS

International Preliminary Report on Patentability received for PCT Patent Application No. PCT/US2015/011582, dated May 26, 2017, 7 pages.

(56) References Cited

OTHER PUBLICATIONS

Fryer, D. et al., "Recon: Verifying File System Consistency at Runtime," (Research Paper), Feb. 16, 2012, 14 pps, https://www.usenix.org/system/files/conference/fast12/fryer2-16-12.pdf.

* cited by examiner

ONLINE FILE SYSTEM CHECK

BACKGROUND

Computer storage systems store data on a computer readable medium. The data may include a set of files and related metadata that together make up a file system. The metadata may include the name, location, organization and/or other information relating to the files. A logical storage volume may be divided into blocks of storage space. The metadata may include a storage bit map (SBM) that indicates which blocks are currently free and which bits are used to store data. When writing to the storage medium, a storage allocation request may be made, and space is assigned from among the free blocks indicated in the SBM.

File system metadata may become corrupted or contain errors. Therefore, a file system check may be made to verify the accuracy and consistency of the file system metadata. For instance, a file system check may verify whether the free blocks indicated in the SBM are actually free. The file system check corrects any errors it finds in the metadata. In this way, a file system check helps to prevent corruption of the file system, or errors such as files, or data blocks being accidentally overwritten.

A file system check may, for example, be carried out in response to a user request, or automatically carried out periodically, or automatically carried out in response to the file system detecting an error in the metadata. A file system check is usually carried out offline, when the file system is un-mounted. In this way the user cannot make read or write requests that might interfere with the offline file system check. However, as the amount of data stored increases, file system checks may take a long time. Thus, an offline file system check, may result in a file system being unavailable for an extended period of time.

BRIEF DESCRIPTION OF THE DRAWINGS

Examples of the disclosure will now be described, by way of non-limiting example only, with reference to the accompanying drawings, in which.

DETAILED DESCRIPTION

In order to increase availability, some storage systems allow a file system check to be carried out online, i.e. while the file system is mounted. The file system may be read by a user while the online file system check is in progress. However, writing to the file system during an online file system check is more problematic, due to the risk that new writes may conflict with changes made to the data, or metadata, as a result of the file system check.

One way to allow writes to a storage system during a file system check is to define a hard reserved partition. For example, an entire volume may be designated as a hard reserved volume. The hard reserved volume is not available during normal operation of the file system, but may be written to during an online file system check. Typically the hard reserved volume is not visible to the user. After the file system check is completed, the data may be migrated from the hard reserved volume to one of the normal volumes. However, this approach means that a large amount of storage space is hard reserved and not available during normal use. Also, if the hard reserved volume runs out of space, then no further writing to the file system is possible until the file system check has been completed. Furthermore, the migration of data from the hard reserved volume to a normal volume takes additional overhead.

The present disclosure proposes a storage volume that includes a non-reserved zone and a soft-reserved zone. "Soft-reserved" means that the reservation is not permanent and storage space from the soft reserved zone may be re-assigned to the non-reserved zone in certain circumstances. For example, during normal operation, file space may be allocated from the non-reserved zone, but during an online file system check storage space may be allocated from the soft-reserved zone. The storage space allocated from the soft-reserved zone is re-assigned to the non-reserved zone and the data is written to the allocated storage space. This allows writing to the storage system during an online file system check, but does not require migration of the data written during the online file system check. It also allows flexibility in the size of the soft-reserved zone. In this way storage space may be more effectively utilized.

Figure 1:
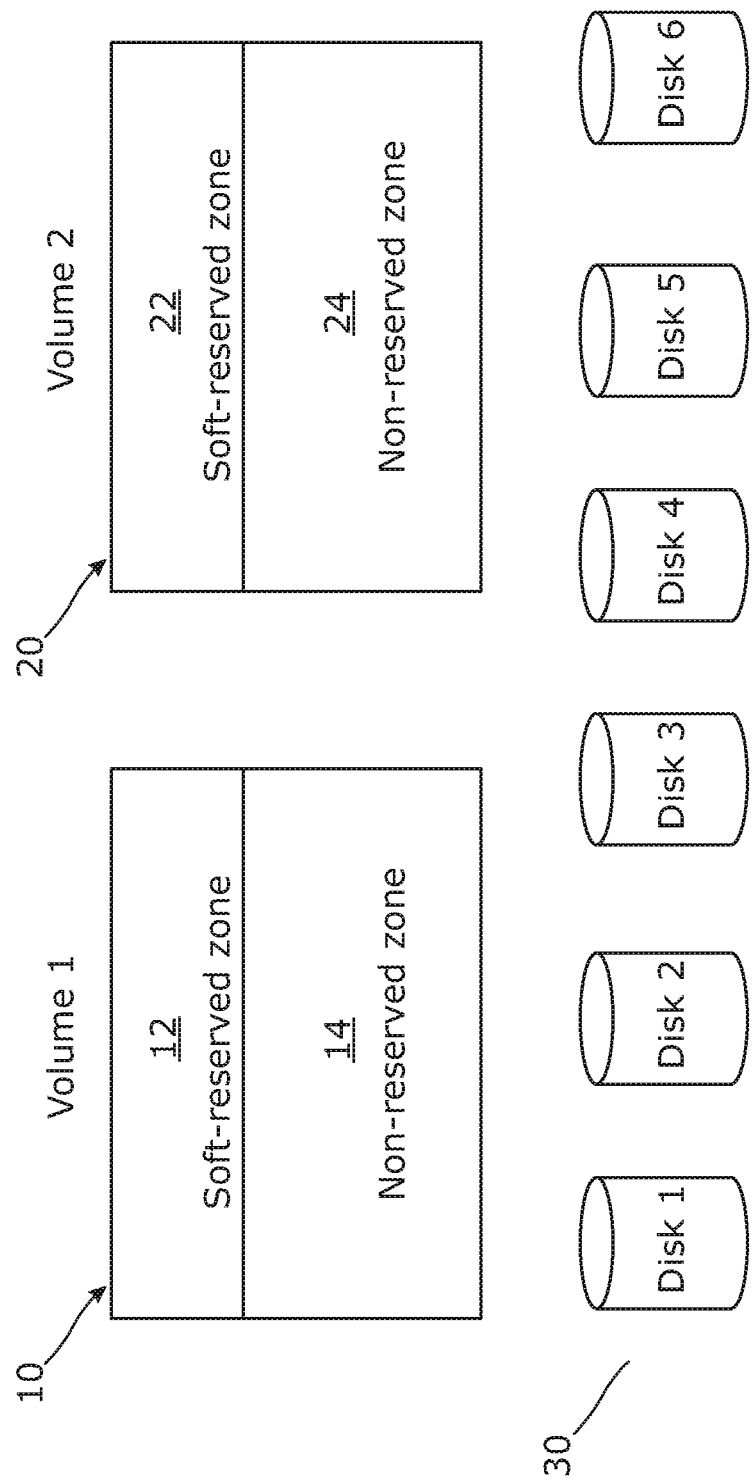
FIG. 1 is a schematic example of a storage system.

FIG. 1 shows a schematic diagram of a storage system. The storage system includes a first logical storage volume 10 and second logical storage volume 20. The first volume includes a soft-reserved zone 12 and a non-reserved zone 14. Likewise, the second volume includes a soft-reserved zone 22 and a non-reserved zone 24. The logical volumes, and their respective zones, are mapped to a physical computer readable storage medium 30. The storage medium 30 may for example comprise a plurality of hard disks.

Each logical volume may be mapped to a single physical disk, or may be mapped to a plurality of physical disks. In the illustrated example, first volume 10 is mapped to storage space on physical disks 1-3 and second volume 20 is mapped to storage space on physicals disks 4-6. However, in other examples, first volume 10 and second volume 20 could be mapped to non-overlapping portions of all of disks 1-6.

Figure 2:
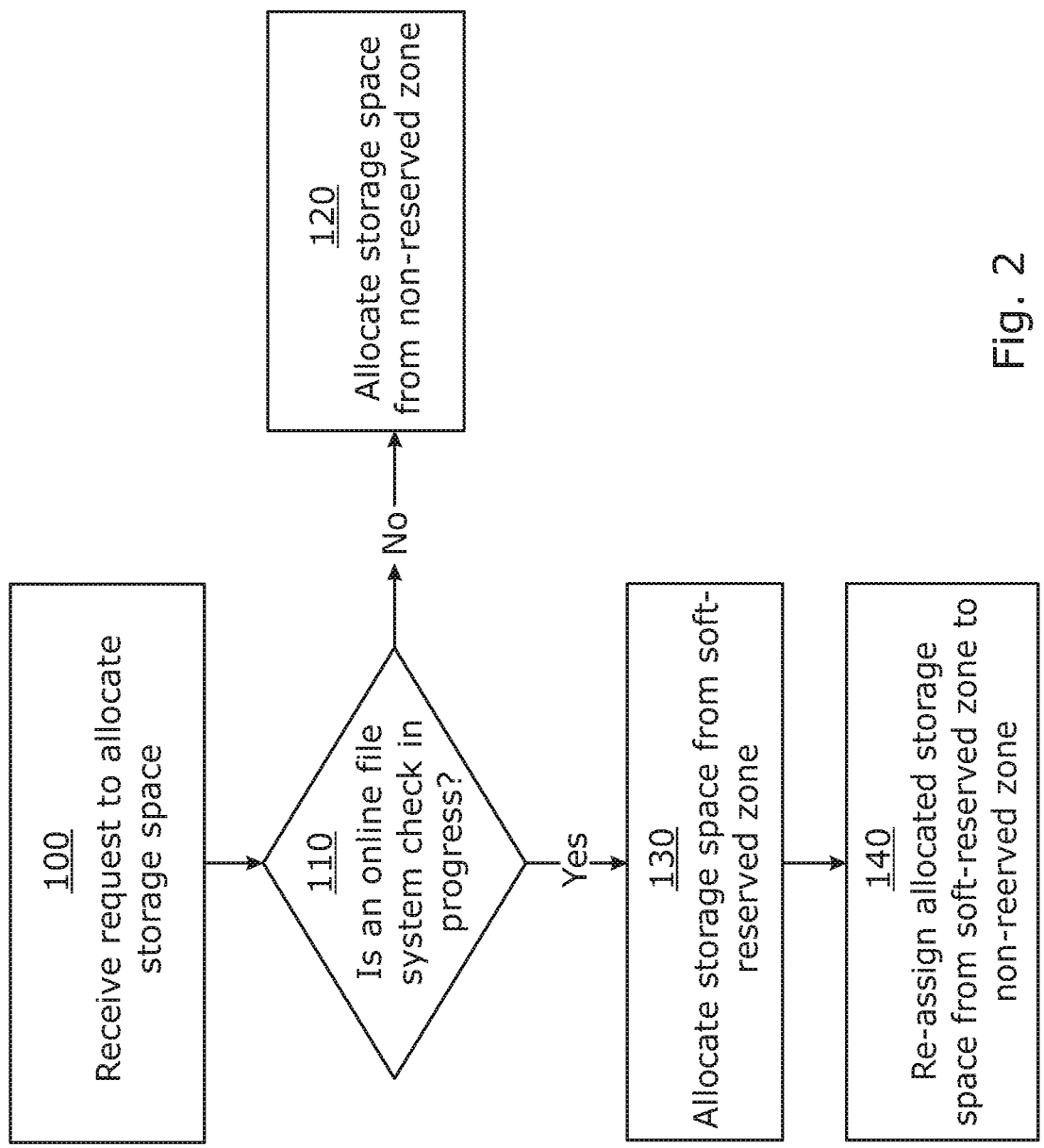
FIG. 2 is a flow diagram showing an example method of allocating storage space.

FIG. 2 shows a method of allocating storage space in the file system. At block 100 a storage allocation request is received, for example when a user instructs data to be written to a volume of the file system. For instance this may occur when a new file is created, or a when a user saves changes to an existing file. As indicated by block 110, the way in which storage is allocated depends upon whether or not a file system check is in progress. If a file system check is not in progress then storage space is allocated from the non-reserved zone at 120. The data may then be written to the allocated storage space. On the other hand, if a file system check is in progress, then storage space is allocated from the soft-reserved zone at block 130. In that case the allocated storage space may be re-assigned from the soft-reserved zone to the non-reserved zone, before writing the data to the allocated storage space.

As the allocated storage space is re-assigned, it is not necessary to migrate the data from a reserved volume to a non-reserved volume of the file system. Compared to some conventional systems that migrate data, this approach may save overhead and bandwidth. Further, in the above example, it can be seen that each volume of the file system has a non-reserved zone and a soft-reserved zone. Therefore, even if a file system check is being carried out on for instance the first volume, it is still possible to write data to the first volume by allocating space from the soft-reserved zone of the first volume.

The file system check may be a full file system check applied to all volumes in the file system, or a partial file system check applied to some, but not all, volumes in the file system. However, unlike some previous known storage systems, the above example allows data to be written to the first volume when a full or partial file system check is applied to the first volume, by writing the data to storage space allocated from the soft-reserved zone of the first volume. Thus, it is not necessary to write the data to a different volume, when the first volume is undergoing a file system check.

In one example the allocated storage space is re-assigned from the soft-reserved zone to the non-reserved zone by updating the file system metadata.

Figure 3:
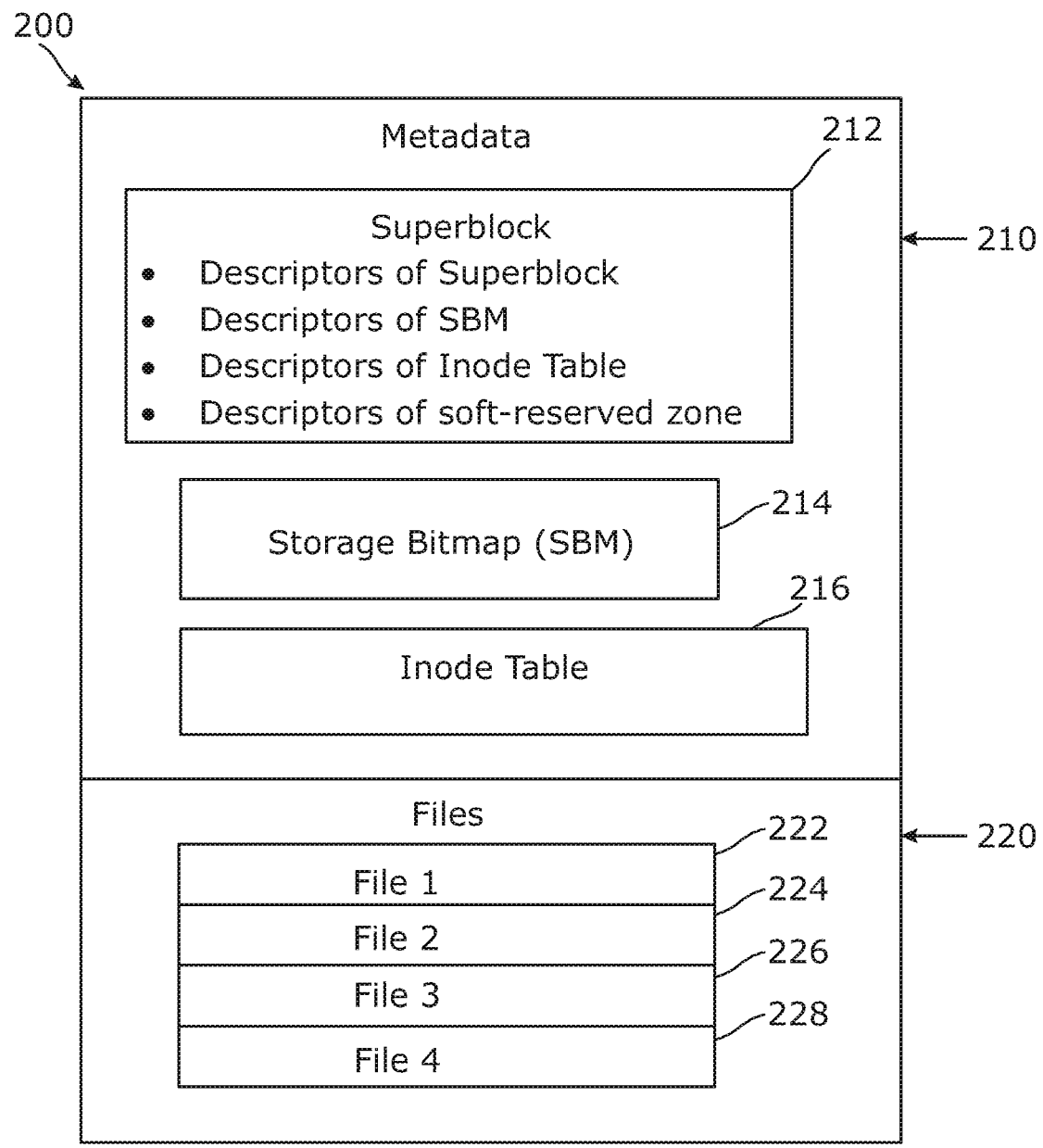
FIG. 3 shows an example structure of a file system.

FIG. 3 is a schematic example of one possible structure of a file system 200. The file system 300 includes a reserved metadata section 210, which is used to store certain types of reserved metadata and a files section 202 that is used to store files and file metadata. The reserved metadata includes a Superblock 212, a Storage Bitmap (SBM) 214 and an Inode Table 216. It may also include a system log and other types of reserved metadata.

The Superblock 212 indicates where certain types of reserved metadata can be found. Thus the Superblock can be described as metadata of the metadata. For example the Superblock may include descriptors of reserved metadata files. Each descriptor may include a pointer to the metadata which it refers to. In the illustrated example the Superblock 212 includes descriptors of the Superblock itself, descriptors of the SBM, descriptors of the Inode Table and descriptors of the soft-reserved zone. Each descriptor may for example include a pointer to a block and an extent indicating the number of contiguous blocks included in the descriptor. The soft-reserved zone may be defined by one or more descriptors. In one example the soft-reserved zone may be defined by a linked list of descriptors. Thus by reading the Superblock the file system is able to determine where to find certain types of metadata and which blocks belong to the soft-reserved zone.

The Storage Bitmap (SBM) is a bitmap that indicates for each block in a logical volume, whether the block is free or is already used to store data. For instance, in one example each bit of the bitmap corresponds to a block of storage space, and a 0 indicates that the block is free, while a 1 indicates that the block is used.

The Inode Table indicates where to find the file metadata for each file. For instance, it may include a list of file names and descriptors indicating where to find each file. The files may be stored in the files section 220. The illustrated example, just shows four files, but in practice there may be fewer files or many more files.

In the case of an AdvFS file system, the Superblock may be the Reserved Bitmap Table (RBMT) and the Inode Table may be the Bitfile Map Table (BMT).

When file space is allocated from the soft-reserved zone, the metadata may be updated to reflect this. For instance the descriptors relating to the allocated blocks may be deleted from the part of the metadata that defines the soft-reserved zone. The SBM may be updated to indicate that the allocated blocks are used, and descriptors may be added to the Inode Table to indicate any blocks that are now used for storing file metadata. In this example, once the metadata is updated, the data is written to the allocated blocks.

Figure 4:
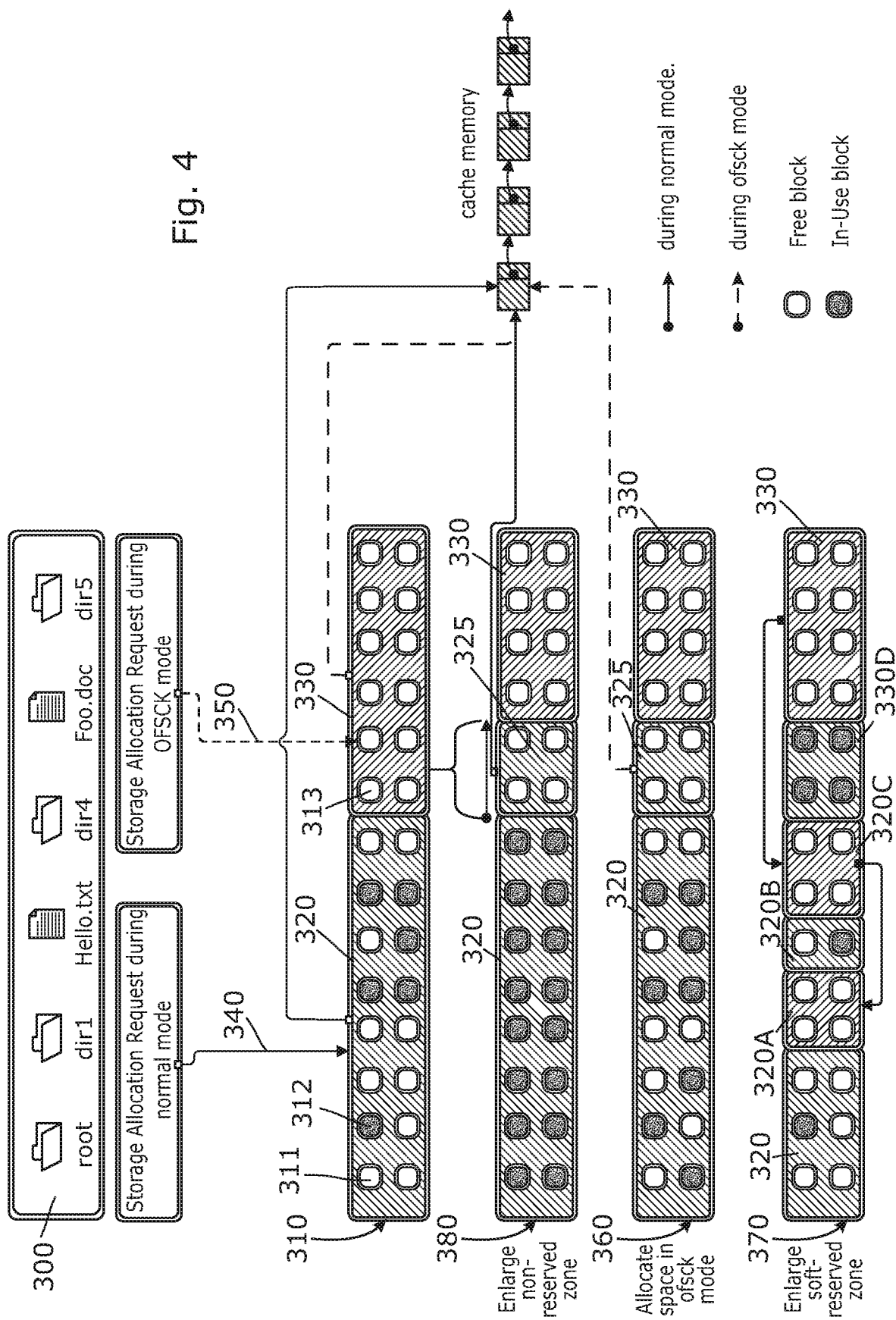
FIG. 4 shows an example of a file system at block level.

FIG. 4 shows an example of a file system and methods of writing to data to the file system. The part indicated by 300 shows the file system as it appears to a user, with various directories and files etc. The part indicated generally by 310 is a representation of a volume of the file system at the physical storage block level. At this level the volume comprises blocks of storage for instance as shown by 311, 312, 313 etc. In the diagram, the empty blocks such as 311, 113 are free blocks that are not currently used to store data, while the filled blocks such as 312 are used blocks that are being used to store data. The volume is divided into a non-reserved zone indicated generally by 320 and a soft-reserved zone indicated generally by 330. The extent of the soft-reserved zone may be defined in metadata of the file system as discussed above.

Generally when the file system is first set up the soft-reserved zone will be a set fraction of the total size of the volume. For instance it may be equal to 1% of the size of the volume. In any case, the soft-reserved zone is usually significantly smaller than the non-reserved zone. In this example, the soft-reserved zone consists entirely of free blocks of storage. Thus the soft-reserved zone may be described as a zone of consistent free space. The soft-reserved zone is not used in normal operation of the storage system, it may be guaranteed with a high degree of confidence that it comprises consistent free space. Consistent free space means that the metadata describing the zone is accurate and the blocks are indeed free storage blocks.

In order for a file system to be available to a user it should be mounted. Once a file system is mounted it is online and may accessed by a user for reading or writing data. The file system may be mounted in a normal mode or in an online file system check (OFSCK) mode.

In the normal mode, a file system check may not be carried out while the file system is online. In that case, to conduct a file system check, the file system should be un-mounted first. Thus, any file system check should be carried out, before issuing an instruction to mount the file system. In the online file system check mode, an online file system check may be carried out while the file system is mounted and online. If it is desired to switch from normal mode to online file system cache mode or vice versa, then file system is un-mounted before re-mounting in the other mode.

Figure 5:
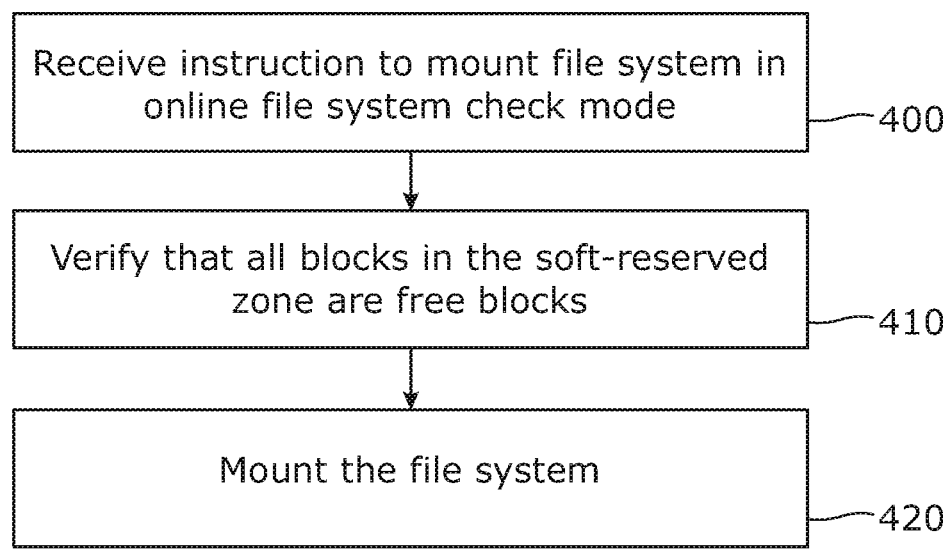
FIG. 5 shows an example method of mounting a file system in online file system check mode.

Mounting the file system in online file system check mode may, for example, be conducted as shown in FIG. 5. At 700 an instruction is received to mount the file system in an online file check mode. At 710 the consistency of the soft-reserved zone is verified. For instance, the consistency of the soft-reserved zone may be verified by comparing the descriptors of the soft-reserved zone with the SMB to make sure that all blocks indicated as being in the soft-reserved zone are indicated as free blocks by the SMB. It may also be checked that the soft-reserved zone does not overlap with the extent of any files described in the file metadata. At 720 the file system is mounted and thus made available to users. Due to the verification process at 710, it may be ensured with a high degree of confidence that the blocks in the soft-reserved zone are indeed free blocks.

Referring back to FIG. 4, when a write instruction is received, for instance due to creating or amending a file, a storage space allocation request is made to the file system. The way in which the storage space is allocated in response to this request depends upon whether the file system is mounted in a normal mode, or an online file system check mode.

If the file system is mounted in a normal mode, then as shown by arrow 340, the free blocks of storage space are allocated from the non-reserved zone. If the file system is mounted in an online file system check mode, then blocks should not be allocated from the non-reserved zone which is having its consistency checked, therefore free blocks are allocated from the soft-reserved zone, as shown by arrow 350.

When allocating free blocks to satisfy storage allocation requests, the storage system may refer to a file system free space cache stored in memory of the computer storage system, rather than reading the metadata directly from the storage volume. Reading the file system free space cache may be quicker than reading the storage volume.

If the file system is mounted in normal mode, then the file system free space cache may be populated with at least some of the free space blocks from the non-reserved zone. The free blocks may for instance be found from the SBM, but checked against the soft-reserved zone descriptors to make sure that they do not belong to the soft-reserved zone. Upon receiving a storage allocation request, free blocks are allocated based on the cache and then removed from the cache, the SBM metadata on the storage volume updated and data written to the allocated blocks. If the free space cache is empty or reduced to a certain threshold, then it may be repopulated by further free space blocks from the non-reserved zone.

If the file system is mounted in online file system check mode, then the file system free space cache may be populated with at least some of the free blocks from the soft-reserved zone. This may be done based on consulting the descriptors defining the soft-reserved zone. Upon receiving a storage allocation request, free blocks are allocated based on the cache and then removed from the cache, the soft-reserved zone metadata on the storage volume is updated and data is written to the allocated blocks. If the free space cache is empty, or reduced to a certain threshold, then it may be repopulated by further free space blocks from the soft-reserved zone.

Referring to another part of FIG. 4, 360 shows an example in which a number of blocks 325 from the soft-reserved zone are allocated to satisfy the storage allocation request. This allocated blocks 325 are re-assigned, for instance by updating file system metadata, so that they belong to the non-reserved zone 320. Data may then be written to the allocated blocks. As a result the size of the soft-reserved zone 330 is reduced as shown in the diagram.

If the size of the soft-reserved zone falls below a certain threshold, action may be taken to increase its size again. An example is shown at 370. In this case the non-reserved zone comprises the portions indicate by 320, 320A, 320B, 320C and 320D. The soft-reserved zone has been reduced to the portion indicated by 330. Therefore the file system enters a scavenging mode to find blocks of free space that may be added to the soft-reserved zone to increase the size of the soft-reserve zone should be in normal mode. The scavenging process finds the free blocks in portions 320C and 320A and re-assigns them to the soft-reserved zone. For instance the file system metadata is updated so that these free blocks now belong to the soft-reserved zone. In this way the soft-reserved zone is enlarged. It will be noted that in this example the soft-reserved zone now comprises a plurality of non-contiguous portions of free storage space 330, 320C and 320A linked as shown by the arrows in the diagram. The soft-reserved zone may be defined by descriptors in a linked list in metadata.

This is a flexible system and allows the soft-reserved zone to use of relatively small portions of free space, wherever they occur in the disk. It may also reduce the need for disk level de-fragmentation. The file system may specify a minimum size of free space, e.g. a minimum number of contiguous free blocks, to be added to the soft-reserved zone in this way. E.g. it can be seen in the example of 370, that minimum size is four blocks of free space, and so the single block of free space 313 is not added to the soft-reserved zone. This minimum size may be determined heuristically depending on circumstances.

Figure 6:
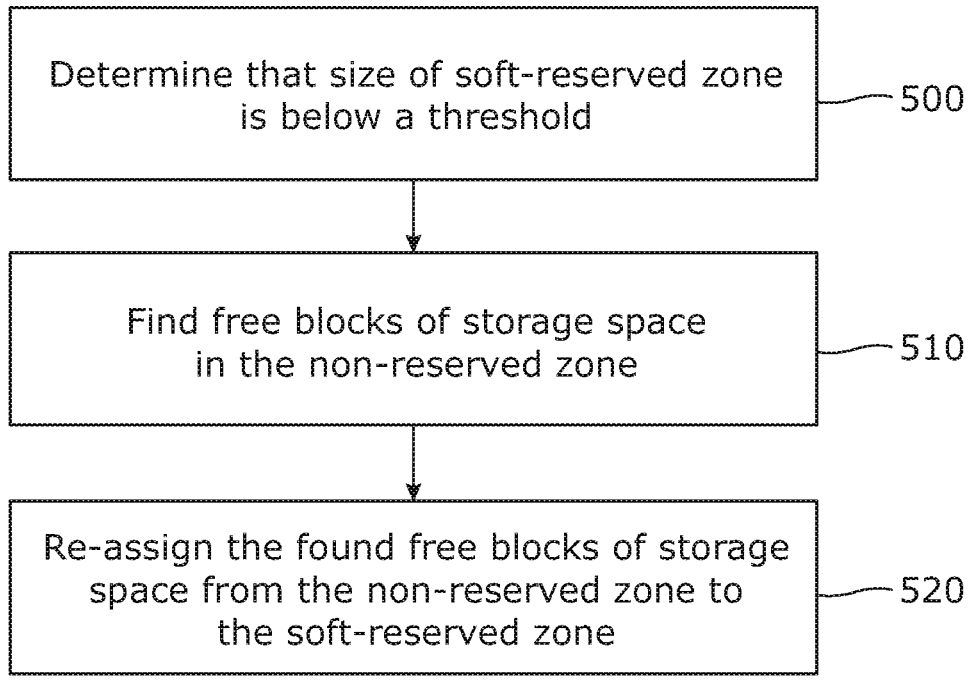
FIG. 6 shows an example method of enlarging a soft-reserved zone.

FIG. 6 is a flow chart showing an example method of enlarging the soft-reserved zone. At 500 it is determined that the size of the soft-reserved zone is below a threshold. At 510 free blocks of storage space are found in the non-reserved zone. At 520 the free blocks of storage space that were found at 510 are re-assigned to the soft-reserved zone, for instance by updating the metadata. This process should be carried out when the file system is in the normal mode, not when the file system is in the online file system check mode.

Referring back to FIG. 4, 380 shows an example in which the non-reserved zone is full and the file system is mounted in normal mode. Thus storage space should be allocated from the non-reserved zone. However, there are no free blocks left in the non-reserved zone. If a situation like this occurs, or if the non-reserved zone is almost full, or if a large file allocation request cannot be satisfied by the available free space in the non-reserved zone, then free space may be allocated from the soft-reserved zone. In the illustrated example blocks of free space 325 are re-assigned from the soft-reserved zone to the non-reserved zone, in a manger similar to that described for 360. After the metadata has been updated these free blocks may be written to. In this way storage space is not wasted.

Figure 7:
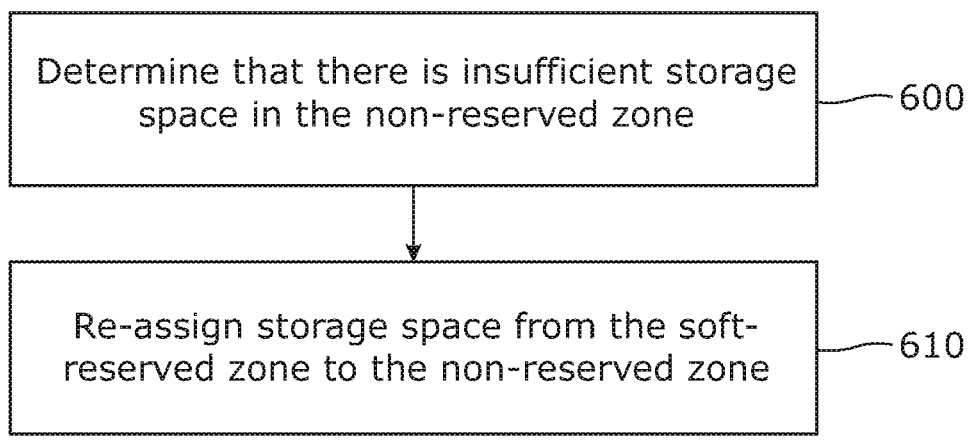
FIG. 7 shows an example method of re-assigning storage space.

FIG. 7 shows an example method of growing the non-reserved zone. At 600 it is determined that there is insufficient space in the non-reserved zone. E.g. the non-reserved zone is full, almost full or has insufficient space to satisfy a file space allocation request as explained above. At 610 storage space from the soft-reserved zone is re-assigned to the non-reserved zone, for instance by updating the metadata. The non-reserved zone is thus enlarged and has extra free space that may be allocated and written to.

Figure 8:
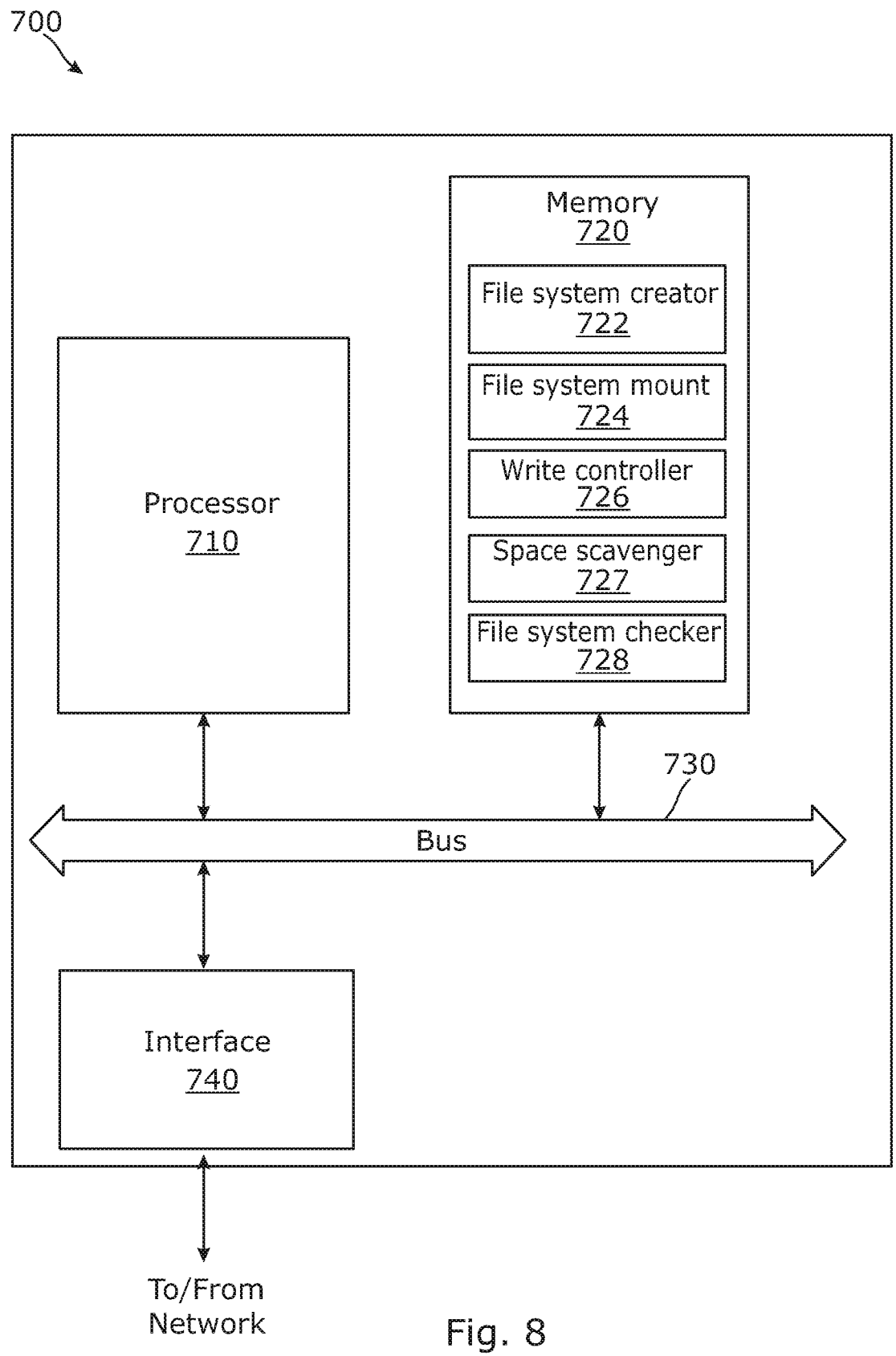
FIG. 8 shows an example apparatus for implementing a file system.

FIG. 8 is a schematic diagram showing an example of a computer system 700 for implementing the file system of the present disclosure. The computer system includes a processor 710, a memory 720 and a communication interface 740 that may be connected by bus 730. The memory 720 stores machine readable instructions that are executable by the processor. The machine readable instructions may include the following modules. A file system creator 722 to set up the file system and define a soft-reserved zone. A file system mount 724 to mount the file system in a normal mode or an online file system check mode. The file system mount 724 may for example mount the file system in an online file system check mode according to the method shown in FIG. 5. A write controller 726 to handle write requests and allocate storage space in the file system. The write controller may allocate write requests according to the methods shown in FIGS. 2 and 4. A space scavenger 727 to find free blocks in the non-reserved zone and re-assign the found blocks to the soft-reserved zone when the size of the soft reserved zone falls below a certain threshold. The space scavenger 727 may operate according to the method shown in FIG. 6 for example. A file system check application 728 to carry out a file system check. The memory may have a cache as well as discussed above with reference to FIG. 4.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A method comprising:
   receiving a request to allocate storage space in a storage volume of a file system, wherein the storage volume comprises a non-reserved zone and a soft-reserved zone;
   if the storage volume is not undergoing an online file system check, then allocating storage space from the non-reserved zone of the storage volume;
   verifying consistency of the soft-reserved zone to determine that all blocks in the soft-reserved zone are free blocks prior to mounting the file system in an online file system check mode; and
   if the storage volume is undergoing the online file system check, then:
      allocating storage space from the soft-reserved zone of the storage volume to allow writing of data on the storage volume while the storage volume is undergoing the online file system check, and
      re-assigning, without migration of data written on the soft-reserved zone during the online file system check, the allocated storage space from the soft-reserved zone to the non-reserved zone by updating metadata associated with blocks of the soft-reserved zone to indicate that the allocated storage space belongs to the non-reserved zone,
   wherein the metadata associated with blocks of the soft-reserved zone is identified via a superblock in a reserved metadata section of the file system, wherein the superblock comprises a descriptor of the soft-reserved zone, and wherein the soft-reserved zone is defined as a linked-list of descriptors in the superblock.

2. The method of claim 1 comprising making a determination, when the online file system check is not in progress, that there is insufficient free space to complete a write request in the non-reserved zone, and in response to said determination re-assigning storage space from the soft-reserved zone to the non-reserved zone and writing data to the re-assigned storage space.

3. The method of claim 1 comprising finding free blocks of storage space in the non-reserved zone and assigning said blocks to the soft-reserved zone, in response to determining that the size of the soft-reserved zone is below a threshold.

4. The method of claim 1 comprising receiving an instruction to mount the file system in the online file system check mode after verifying that all blocks in the soft-reserved zone are free blocks.

5. The method of claim 1 comprising storing metadata defining at least a portion of the soft-reserved zone in a cache memory of a computer system.

6. The method of claim 1, wherein the descriptor comprises a pointer to the metadata associated with blocks of the soft-reserved zone and an extent indicating a number of contiguous blocks included in the descriptors.

7. A non-transitory computer readable medium storing machine readable instructions that are executable by a processor to:
   receive an instruction to mount a file system in a normal mode or in an online file system check mode, wherein the file system uses storage space from a storage system comprising a storage volume, wherein the storage volume includes a zone of consistent free space;
   mount the file system in the normal mode or in the online file system check mode;
   verifying consistency of the zone of consistent free space to determine that all blocks in the zone of consistent free space are free blocks before mounting the file system in the online file system check mode;
   in response to receiving a storage allocation request when the file system is mounted in the normal mode, allocate storage from a zone outside the zone of consistent free space;
   in response to receiving a storage allocation request when the file system is mounted in the online file system check mode, allocate storage space from inside the zone of consistent free space to allow writing of data on the storage volume while the file system is mounted in the online file system check mode; and
   re-assign, without migration of data written on the zone of consistent free space during the online file system check, the allocated storage space from the zone of consistent free space to the zone outside the zone of consistent free space by updating metadata associated with blocks of the zone of consistent free space to indicate that the allocated storage space belongs to the zone outside the zone of consistent free space,
   wherein the metadata associated with blocks of the zone of consistent free space is identified via a superblock in a reserved metadata section of the file system, wherein the superblock comprises a descriptor of the zone of consistent free space, and wherein the zone of consistent free space is defined as a linked-list of descriptors in the superblock.

8. The computer readable storage medium of claim 7 wherein the consistency of the zone of consistent free space is verified after receiving the instruction to mount the file system in the online file system check mode and before mounting the file system.

9. The computer readable storage medium of claim 7, comprising instructions to update the metadata to remove, from the zone of consistent free space, any blocks that have been allocated in response to the storage allocation request.

10. The computer readable medium of claim 7, comprising instructions to allocate storage from inside said zone of consistent free space when the file system is mounted in the normal mode, if it is not possible to allocate sufficient free space from portions of the file system that are outside said zone of consistent free space.

11. The computer readable medium of claim 7, comprising instructions to find consistent free blocks outside of said zone of consistent free space and enlarge said zone of consistent free space by adding descriptors defining the found blocks to the metadata defining the zone of consistent free space.

12. A computer storage system comprising a file system that includes a single storage volume or a plurality of storage volumes, wherein a storage volume of the plurality of storage volumes includes:
  a non-reserved zone to store files; and
  a soft-reserved zone to store files when the file system is in an online file system check mode, wherein the soft-reserved zone is not available to store files if the file system is in a normal mode and there is sufficient storage space for the files in the non-reserved zone;
  wherein the soft-reserved zone is defined by metadata and a consistency of the soft-reserved zone is verified prior to mounting the file system in the online file system check mode to determine that all blocks in the soft-reserved zone are free blocks,
  wherein storage space from the soft-reserved zone is re-assigned, without migration of data written on the soft-reserved zone during the online file system check, to the non-reserved zone by updating the metadata associated with blocks of the soft-reserved zone to indicate that the allocated storage space belongs to the non-reserved zone, and
  wherein the metadata associated with blocks of the soft-reserved zone is identified via a superblock in a reserved metadata section of the file system, wherein the superblock comprises a descriptor of the soft-reserved zone, and wherein the soft-reserved zone is defined as a linked-list of descriptors in the superblock.

13. The computer system of claim 12 comprising a first storage volume and a second storage volume, each of the first volume and the second volume including a non-reserved zone and a soft-reserved; and the computer system further comprising a write controller to:
  write data to space allocated from the non-reserved zone of the first volume in response to a request to write data to the first volume in a normal operation mode of the file system; and
  write data to space allocated from the soft-reserved zone of the first volume space in response to a request to write data to the first volume in an online file system check mode of the file system.

14. The computer system of claim 13 wherein the soft-reserved zone comprises at least some free blocks that are not contiguous, but are connected by linked-list of descriptors in the superblock.

* * * * *